April 24, 1945. H. J. DE N. McCOLLUM 2,374,609
HEATING APPARATUS
Filed Sept. 5, 1942 3 Sheets-Sheet 1
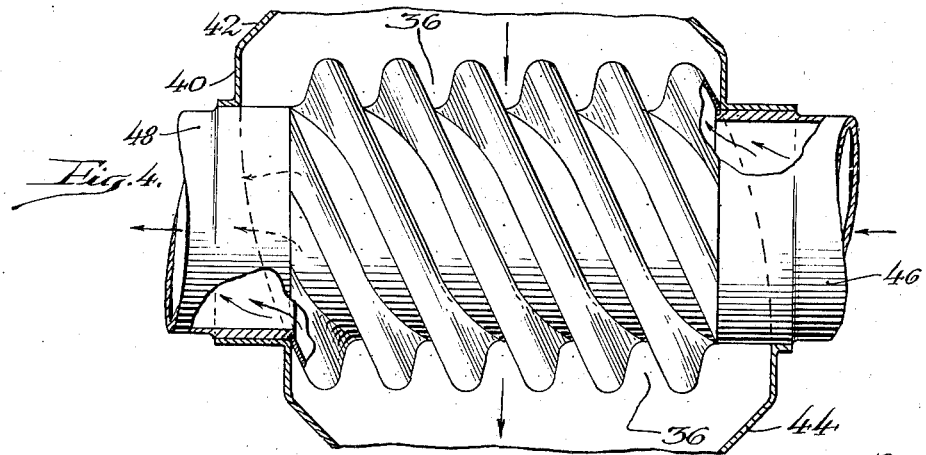
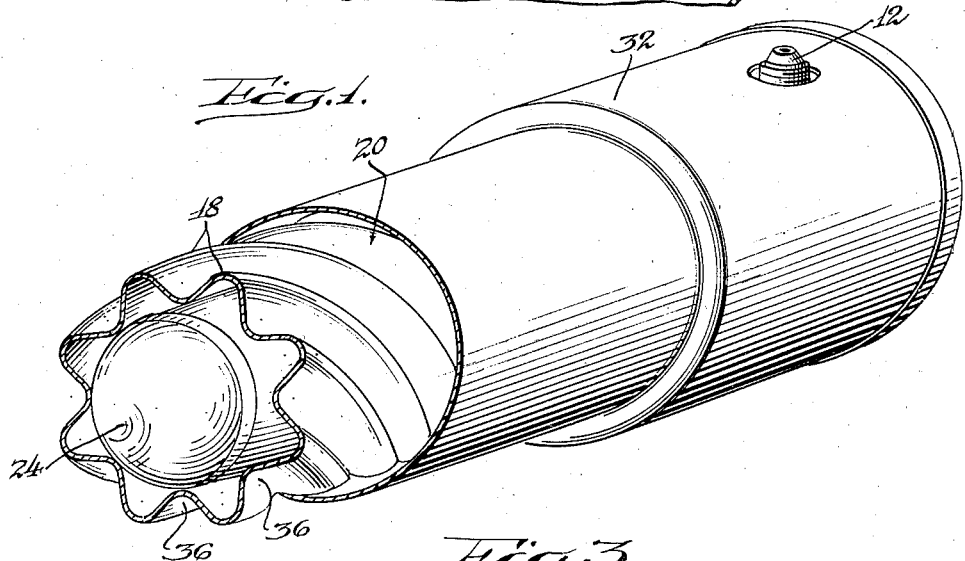
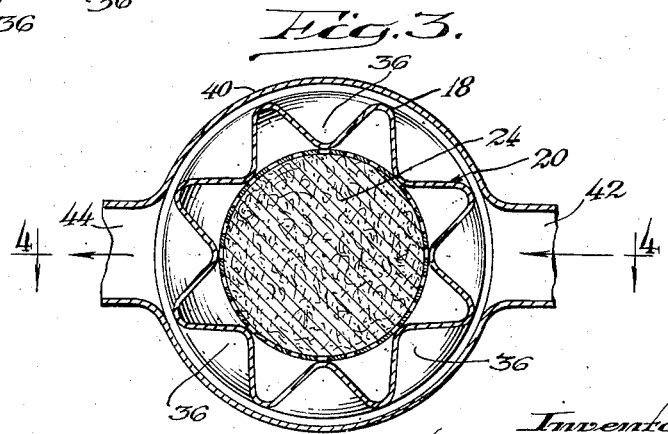

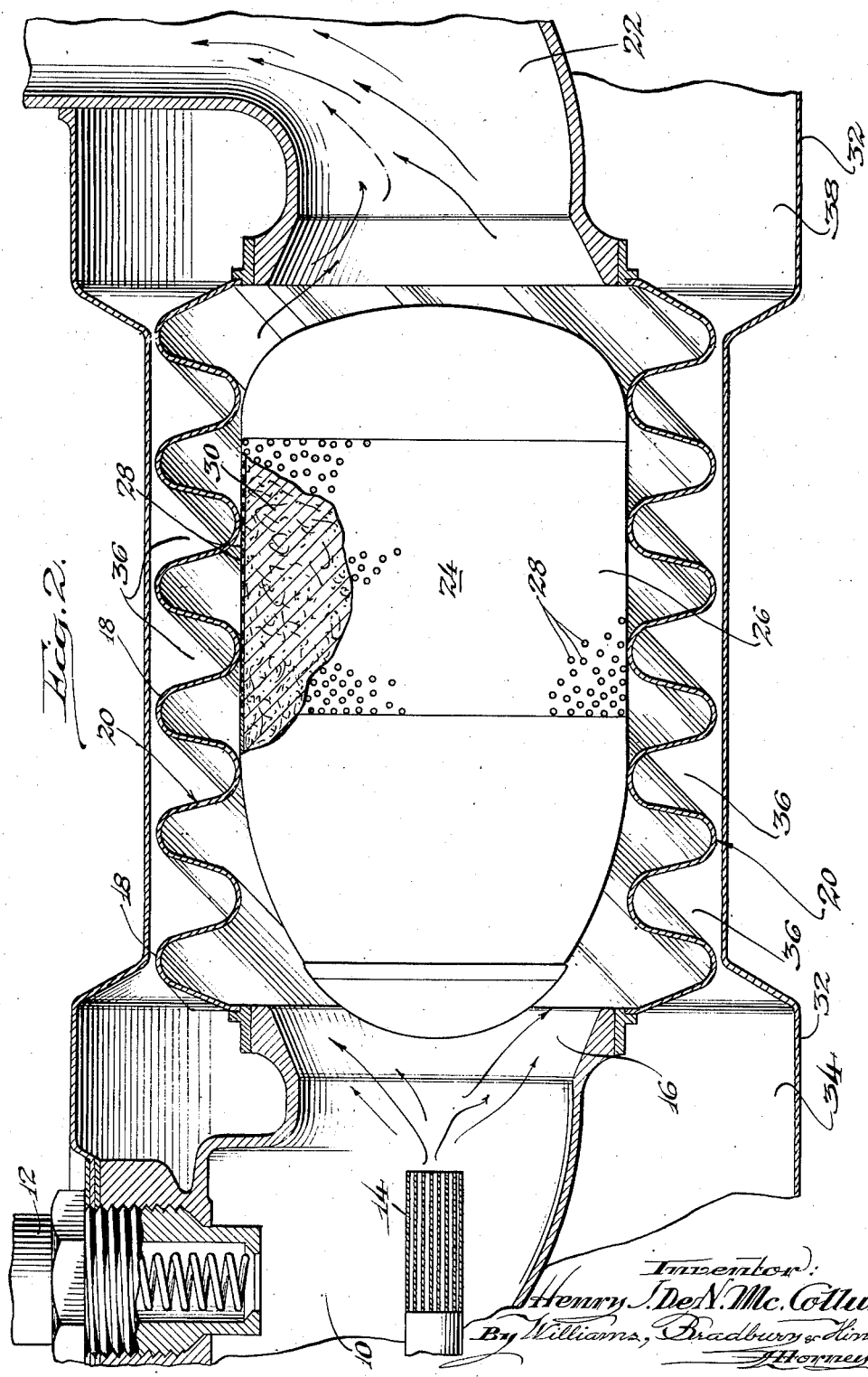

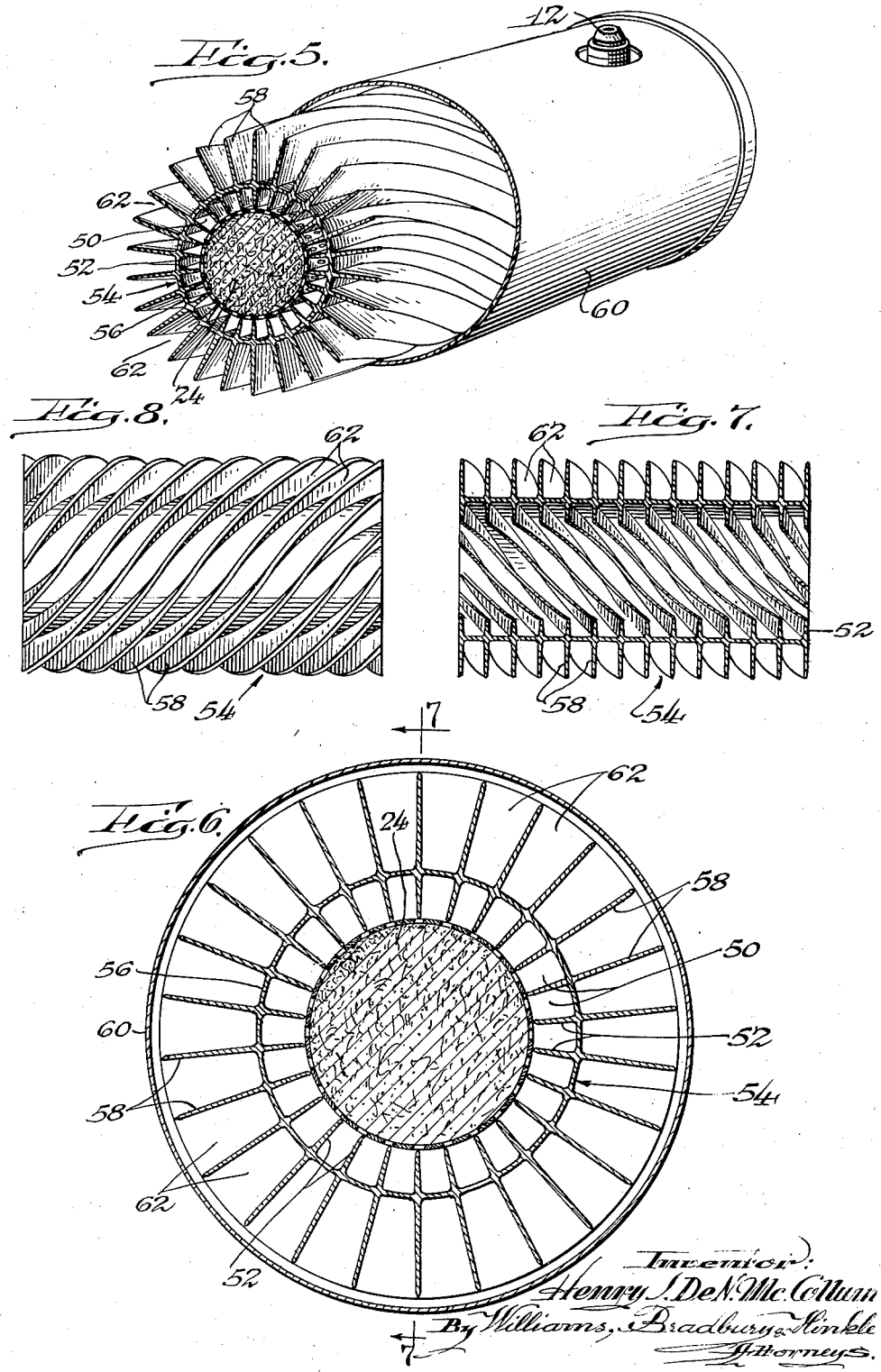

Patented Apr. 24, 1945

2,374,609

UNITED STATES PATENT OFFICE 2,374,609

HEATING APPARATUS

Henry J. De N. McCollum, Chicago, Ill.; Thelma McCollum executrix of said Henry J. De N. McCollum, deceased Application September 5, 1942, Serial No. 457,448

1 Claim. (Cl. 126—116)

My invention pertains to heating apparatus and is more particularly concerned with heating apparatus of the kind used to heat the cabin or other space of aircraft, although it is not limited to such use and is capable of general application.

An object of my invention is to provide heating apparatus having a new and improved heat exchanger which provides more efficient transfer of heat.

Another object of my invention is to provide heating apparatus which is more adaptable to widely different uses than the heating apparatus of the prior art.

Another object of my invention is to provide a new and improved heat exchanger.

Other objects and advantages will become apparent as the description proceeds.

Fig. 1 is a perspective view of a preferred embodiment of my invention. In this figure part of the casing is cut away to show more clearly the structure of the heat exchanger;

Fig. 2 is a longitudinal sectional view of the heating apparatus of Fig. 1;

Fig. 3 is a transverse sectional view through a modified form of my invention;

Fig. 4 is a horizontal sectional view taken on the line 4—4 of Fig. 3;

Fig. 5 is a perspective view showing a further embodiment of my invention. In this figure part of the casing is cut away and the heat exchanger is shown in cross-section;

Fig. 6 is a transverse sectional view of the embodiment shown in Fig. 5;

Fig. 7 is a longitudinal sectional view taken on the line 7—7 of Fig. 6; and

Fig. 8 is a side elevational view of the heat exchanger of Fig. 5.

In Figs. 1 and 2, I have illustrated my invention as being embodied in a heater having a combustion chamber 10 supplied with a combustible mixture from any suitable source. This combustible mixture is ignited by an electrical igniter 12 supplied with current from a battery, generator, or any other suitable source of electrical energy. The igniter 12 is of the hot wire type and may be provided with the usual thermostatic switch for breaking the igniter circuit when the heater attains normal operating temperature. I have illustrated my heater as being provided with a reigniter 14 which serves to maintain combustion after the igniter 12 has been cut out.

The hot gases, which constitute the products of combustion, flow from the combustion chamber 10 through a flaring annular passage 16 into the spiral hollow fins 18 which extend lengthwise of the tubular heat exchanger 20. The hot gases follow the spiral path provided by these hollow fins 18 and are discharged at the right hand end of the heater into an exhaust pipe 22 which leads to atmosphere.

A muffler 24 is located in the heat exchanger 20 and has a shell 26 provided with openings 28 forming acoustic couplings between the gas passages provided by the hollow fins and the interior of the shell 26. The interior of this shell is filled with suitable sound absorbing and heat resisting material 30 such, for example, as glass wool or stainless steel wool.

As the hot products of combustion traverse the helical passages formed in the helical fins 18, these gases give up their heat to the fins 18 and heat exchanger 20 of which these fins constitute an integral part. Because the hot gases are continually changing their direction of travel as they traverse these fins, the gases exert a scrubbing action on the inner walls of the fins 18 and the rate of heat transfer between these gases and the fins is exceedingly high.

The heater is provided with an enclosing casing 32 having an inlet 34 into which ventilating air is forced by a blower, ram, or other suitable means. In the embodiment shown, the inlet 34 surrounds the combustion chamber 10 and the incoming ventilating air absorbs heat from the walls of this combustion chamber. Most of the heat received by the ventilating air, however, is obtained from heat exchanger 20. The ventilating air flows into the left hand or inlet ends of the helical passages 36 formed between the fins 18 and passes from the outlets of these passages into the ventilating duct 38 which may communicate directly with the aircraft cabin or may extend to a plurality of openings or outlets whereby the heated air is distributed to different locations in the cabin or other space.

As the ventilating air traverses the passages 36, it also is continually changing direction and has a scouring effect on the external surface of the heat exchanger 20. This results in the transfer of great quantities of heat from the heat exchanger to the ventilating air and materially contributes to the efficiency of operation of my novel heating apparatus. The heat exchanger 20 is illustrated as having a thin wall dividing the products of combustion from the ventilating air so that the heat transferred from the hot gases to the ventilating air traverses only a very short metallic path. Because of this short path, it is not essential that the heat exchanger 20 be made of metal having the highest coefficient of heat conductivity and this heat exchanger may be made of stainless steel or other metals of relatively low heat conductivity when metals of high heat conductivity are too expensive, unavailable, or undesirable.

The heat exchanger 20 may be made in any one of several different ways. One way of making this heat exchanger is to roll the fins into a cylindrical shell blank. This heat exchanger may also be made by forming a strip to the shape of a hollow fin, arranging complementary strips side by side in helical relationship, and seam welding the adjacent edges of the complementary strips in the same manner in which steel tubing of the spirally wrapped type is made. The heat exchanger 20 may also be die cast of aluminum alloy or other suitable material and in this event the core of the die would be screwed out of the cast heat exchanger and this casting would then be screwed out of the female die. The heat exchanger may also be made by the continuous extrusion process.

In the embodiment of Figs. 1 and 2, the ventilating air is directed over the exterior of the heat exchanger in a direction parallel to the axis of this heat exchanger. In the embodiment of Figs. 3 and 4, however, the ventilating air is directed over the heat exchanger in a direction transverse to the axis of this heat exchanger. Where the fins of the heat exchanger are at an angle of 45° to the axis of this heat exchanger, the heat exchanger is equally adapted for use in either the arrangement of Figs. 1 and 2 or the arrangement of Figs. 3 and 4 and is capable of more different uses and of accommodating more different conditions of use than are the heat exchangers of the prior art.

In Figs. 3 and 4, the heat exchanger 20 is illustrated as being located in a casing 40 having a ventilating air inlet 42 located at one side of the axis of the heat exchanger and a ventilating air outlet 44 located at the other side of this axis. The ventilating air entering the inlet 42 divides into two streams. One of these streams flows through those parts of the air passages 36 which are located above the axis of the heat exchanger and the other stream flows through those portions of the passages 36 which are located below this axis.

In the embodiment of Figs. 3 and 4, the ventilating air travels both around and lengthwise of the heat exchanger and is continually changing its course so that the same efficient transfer of heat exists between this ventilating air and the external surfaces of the heat exchanger as existed in the previous embodiment. It will, of course, be understood by those skilled in the art that the number of fins 18 may be widely varied and that the number of passages 36 formed between these fins will vary correspondingly.

Referring to Fig. 3, it will be seen that a muffler 24 is located in the heat exchanger 20 and this muffler may be identical with the muffler shown in detail in Fig. 2 or may be of any other suitable construction. The hot gas is supplied to the interior of the fins 18 either by a combustion chamber like the combustion chamber 10 of Fig. 2 or from the exhaust pipe 46 of an internal combustion engine or from any other suitable source. The cooled exhaust gases leave the heater through a discharge pipe 48. The inlet 42 of the casing 40 may be connected with a blower or ram for supplying the ventilating air, or the outlet 44 may be connected to a suction creating device, or any other suitable means may be provided for creating a circulation of ventilating air through the casing 40.

In Fig. 5, I have illustrated a heater which is generally similar to the heater shown in Figs. 1 and 2, but which is provided with a different type of heat exchanger. The heater of Fig. 5 has an igniter 12 for igniting the combustible mixture supplied to a combustion chamber, not shown, and the hot gases resulting from the combustion in this chamber flow through the passages 50 formed between the interior fins 52 of a heat exchanger 54. This heat exchanger has an annular wall 56 which is integral with the interior fins 52 and the exterior fins 58. As shown in Figs. 7 and 8, these fins are spiraled and are illustrated as forming an angle of 45° with the axis of the heat exchanger 54 but this angle may be varied as needed to give any desired results.

In Fig. 7, the interior fins are shown as having the same angle of inclination as the exterior fins and in some methods of manufacture this arrangement would be essential; but where the heat exchanger is sand cast of copper, aluminum, or other suitable material, the angle of inclination of the interior and exterior fins may be either the same or different. A muffler 24 is located in the integral heat exchanger 54 and may be identical with the muffler shown in Fig. 2 or may have any other suitable or desired construction. This muffler cooperates with the interior fins 52 and wall 54 to form the spiral passages 50 through which the hot gases flow.

The heater of Figs. 5 to 8, inclusive, has a casing 60 which surrounds the heat exchanger 54 and cooperates therewith to form the spiral passages 62 for the ventilating air. This ventilating air may either be forced into one end of the casing by a ram, blower, or other pressure producing means, or may be sucked through the passages 62 by a suction producing means associated with the outlet end of the casing 60. This ventilating air may be supplied directly from the casing 60 to the aircraft cabin or other space to be heated or may be passed through a duct arrangement for distributing this heated air to selected locations.

In Fig. 5, I have illustrated the heat exchanger 54 as being incorporated in an internal combustion type of heater which has its own combustion chamber and which may correspond in this regard to the heater shown in Figs. 1 and 2. The heat exchanger 54 is particularly adapted for use in an exhaust heater which is supplied with hot gases from the exhaust pipe of an internal combustion engine and it is to be understood that my novel heat exchanger 54 is not limited to use in an internal combustion heater like that shown in Fig. 5.

The interior and exterior fins of the heat exchanger 54 are shown as being equal in number, but this is not essential to the proper operation of my heat exchanger and the interior fins may be either greater, less, or equal in number to the exterior fins. The interior fins are also shown as being shorter than the exterior fins, but this relationship may be varied as desired to suit different conditions of use. Where the exterior fins of the heat exchanger 54 are arranged at a 45° angle as shown, this heat exchanger is equally adapted for use in a casing like the casing 60 which is designed to produce longitudinal flow of the ventilating air or in a casing like the casing which is designed to produce transverse flow of the ventilating air.

My novel heating apparatus is not limited to the transfer of heat from burned gases to ventilating air, but may be used to transmit heat between any other fluids. It may be made of any suitable material and by any suitable method and is not to be construed as limited to the details shown and described, but is to be considered as embodying all variations and modifications falling within the scope of the appended claim.

I claim:

A heating apparatus comprising a combustion chamber, a heat exchanger for receiving products of combustion from said combustion chamber, said heat exchanger having a tubular body provided with spirally arranged fins, a cylindrical shell inside said heat exchanger closely fitting the same and thereby confining the flow of said products of combustion between the shell and the interior of the spirally arranged fins of the heat exchanger, said shell forming a container for acoustic damping material, acoustic damping material in said shell, means for directing ventilating air over said tubular heat exchanger to receive heat therefrom, and a cylindrical casing enclosing the heat exchanger closely fitting the same and thereby confining said ventilating air between said casing and the exterior of the spirally arranged fins.

HENRY J. DE N. McCOLLUM.